(12) United States Patent
Garcia Duran et al.

(10) Patent No.: US 10,963,941 B2
(45) Date of Patent: Mar. 30, 2021

(54) METHOD AND SYSTEM FOR COMBINING USER, ITEM AND REVIEW REPRESENTATIONS FOR RECOMMENDER SYSTEMS

(71) Applicant: NEC Laboratories Europe GmbH, Heidelberg (DE)

(72) Inventors: Alberto Garcia Duran, Heidelberg (DE); Roberto Gonzalez Sanchez, Heidelberg (DE); Mathias Niepert, Heidelberg (DE); Daniel Onoro Rubio, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 198 days.

(21) Appl. No.: 15/895,063

(22) Filed: Feb. 13, 2018

(65) Prior Publication Data
US 2019/0080383 A1  Mar. 14, 2019

Related U.S. Application Data (60) Provisional application No. 62/555,670, filed on Sep. 8, 2017.

(51) Int. Cl.
*G06Q 30/00* (2012.01)
*G06Q 30/06* (2012.01)
(Continued)

(52) U.S. Cl.
CPC ..... *G06Q 30/0631* (2013.01); *G06F 16/2228* (2019.01); *G06F 16/9535* (2019.01);
(Continued)

(58) Field of Classification Search
None
See application file for complete search history.

(56) References Cited

U.S. PATENT DOCUMENTS

| 2010/0100416 A1* | 4/2010 | Herbrich | G06Q 30/02 |
| | | | 705/7.32 |
| 2013/0166406 A1* | 6/2013 | Yardley | G06Q 30/0631 |
| | | | 705/26.7 |
| 2016/0267377 A1* | 9/2016 | Pan | G06F 17/2785 |

OTHER PUBLICATIONS

Patents; researchers submit patent application, "generating a classifier for performing a query to a given knowledge base", for approval (USPTO 20150339577). (Dec. 14, 2015). Journal of Robotics & Machine Learning Retrieved from https://dialog.proquest.com/professional/docview/1747426737 (Year: 2015).*

(Continued)

*Primary Examiner* — Allison G Wood
*Assistant Examiner* — Ashley D Preston
(74) *Attorney, Agent, or Firm* — Leydig, Voit & Mayer, Ltd.

(57) ABSTRACT

A method for providing recommendations to users includes obtaining stored data structure triples and actual ratings associated with the data structure triples; training a machine learning model using the stored data structure triples and associated actual ratings, wherein training the machine learning model includes generating user, product, and review representations based on the stored data structure triples and their associated ratings; predicting, by the machine learning model, ratings using the generated user, product, and review representations; and making recommendations based on the predicted ratings.

17 Claims, 10 Drawing Sheets

(51) Int. Cl.
  *G06Q 30/02* (2012.01)
  *G06N 3/08* (2006.01)
  *G06N 5/04* (2006.01)
  *G06F 16/22* (2019.01)
  *G06F 16/9535* (2019.01)
  *G06N 3/04* (2006.01)
  *G06F 16/9536* (2019.01)
  *G06N 5/02* (2006.01)

(52) U.S. Cl.
  CPC ....... *G06F 16/9536* (2019.01); *G06N 3/0427* (2013.01); *G06N 3/0454* (2013.01); *G06N 3/084* (2013.01); *G06N 5/022* (2013.01); *G06N 5/04* (2013.01); *G06Q 30/0282* (2013.01)

(56) References Cited

OTHER PUBLICATIONS

Julian McAuley, et al., "Hidden Factors and Hidden Topics: Understanding Rating Dimensions with Review Text", RecSys '13 Proceedings of the 7$^{th}$ ACM conference on Recommender Systems, pp. 165-172, Oct. 12-16, 2013.

Antoine Bordes, et al., "Translating Embeddings for Modeling Multi-relational Data", Advances in Neural Information Processing Systems 26 (NIPS 2013), pp. 1-9, Dec. 2013.

Leon Bottou, "Large-Scale Machine Learning with Stochastic Gradient Descent", Proceedings of COMPSTAT'2010, pp. 177-186, Sep. 30, 2010.

Yehuda Koren, et al., "Matrix Factorization Techniques for Recommender Systems", Journal Computer, vol. 42, issue 8, pp. 30-37, Aug. 6, 2009.

Sheng Zhang, et al., "Learning from Incomplete Ratings Using Non-negative Matrix Factorization", Conference: Conference: Proceedings of the Sixth SIAM, International Conference on Data Mining, pp. 548-552, Apr. 20-22, 2006.

Sungyong Seo, et al., "Representation Learning of Users and Items for Review Rating Prediction Using Attention-based Convolutional Neural Network", Dec. 2017, pp. 1-8.

* cited by examiner

| | #Users | #Items | #Words | #Training | #Validation | #Test |
|---|---|---|---|---|---|---|
| Amazon Instant Video | 5,131 | 1,686 | 513 | 27,610 | 3,449 | 3,445 |
| Automotive | 2,929 | 1,836 | 589 | 15,741 | 1,965 | 1,963 |
| Baby | 22,364 | 12,102 | 497 | 124,978 | 15,612 | 15,613 |
| CDs and Vinyl | 75,259 | 64,444 | 576 | 813,897 | 101,600 | 101,581 |
| Grocery Gourmet Food | 14,682 | 8,714 | 565 | 116,192 | 14,502 | 14,499 |
| Health Personal Care | 38,610 | 18,535 | 573 | 261,102 | 32,588 | 32,585 |
| Kindle Store | 68,224 | 61,935 | 456 | 717,845 | 89,628 | 89,637 |
| Musical Instruments | 1,430 | 901 | 512 | 7,925 | 989 | 985 |
| Office Products | 4,906 | 2,421 | 652 | 41,687 | 5,210 | 5,206 |
| Patio, Lawn Garden | 1,687 | 963 | 697 | 10,320 | 1,279 | 1,285 |
| Pet Supplies | 19,857 | 8,511 | 515 | 120,831 | 15,073 | 15,070 |
| Tools & Home Improvement | 16,639 | 10,218 | 587 | 103,373 | 12,911 | 12,910 |
| Toys Games | 19,413 | 11,925 | 516 | 127,712 | 15,864 | 15,850 |
| Beauty | 22,364 | 12,102 | 497 | 150,452 | 18,774 | 18,783 |
| Digital Music | 5,542 | 3,569 | 625 | 48,283 | 6,029 | 6,021 |
| Video Games | 24,304 | 10,673 | 591 | 175,650 | 21,948 | 21,937 |
| Sports Outdoors | 35,599 | 18,358 | 530 | 224,596 | 28,045 | 28,035 |
| Cell Phones Accessories | 27,880 | 10,430 | 504 | 149,668 | 18,667 | 18,673 |
| YELP | 45,981 | 11,538 | 5,314 | 183,886 | 20,315 | 20,294 |

FIG. 6

| k | Baby | Digital Music | Office Products | Tools&Home Improv. |
|---|---|---|---|---|
| 4 | 1.100 | 0.782 | 0.721 | 0.878 |
| 8 | 1.100 | 0.782 | 0.721 | 0.878 |
| 16 | 1.100 | 0.782 | 0.721 | 0.878 |
| 32 | 1.100 | 0.782 | 0.721 | 0.879 |
| 64 | 1.100 | 0.782 | 0.721 | 0.879 |

FIG. 7

| | Offset | Attn+CNN | NMF | SVD | HFT | TRANSREV |
|---|---|---|---|---|---|---|
| Amazon Instant Video | 1.180 | 0.936 | 0.946 | 0.904 | 0.888 | 0.884 |
| Automotive | 0.948 | 0.881 | 0.876 | 0.857 | 0.862 | 0.857 |
| Baby | 1.262 | 1.176 | 1.171 | 1.108 | 1.104 | 1.100 |
| CDs and Vinyl | 1.127 | 0.866 | 0.871 | 0.863 | 0.854 | 0.853 |
| Grocery and Gourmet Food | 1.165 | 1.004 | 0.985 | 0.964 | 0.961 | 0.958 |
| Health and Personal Care | 1.200 | 1.054 | 1.048 | 1.016 | 1.014 | 1.013 |
| Kindle Store | 0.87 | 0.617 | 0.624 | 0.607 | 0.593 | 0.599 |
| Musical Instruments | 0.733 | 0.703 | 0.725 | 0.694 | 0.692 | 0.688 |
| Office Products | 0.876 | 0.726 | 0.742 | 0.727 | 0.727 | 0.721 |
| Patio, Lawn and Garden | 1.156 | 0.999 | 0.958 | 0.950 | 0.956 | 0.945 |
| Pet Supplies | 1.354 | 1.236 | 1.241 | 1.198 | 1.194 | 1.191 |
| Tools and Home Improvement | 1.017 | 0.938 | 0.908 | 0.884 | 0.884 | 0.878 |
| Toys and Games | 0.975 | - | 0.821 | 0.788 | 0.784 | 0.783 |
| Beauty | 1.322 | - | 1.204 | 1.168 | 1.165 | 1.158 |
| Digital Music | 1.137 | - | 0.805 | 0.797 | 0.793 | 0.782 |
| Video Games | 1.401 | - | 1.138 | 1.093 | 1.086 | 1.081 |
| Sports and Outdoors | 0.931 | - | 0.856 | 0.828 | 0.824 | 0.824 |
| Cell Phones and Accessories | 1.455 | - | 1.357 | 1.290 | 1.285 | 1.280 |
| YELP | 1.385 | 1.212 | 1.229 | 1.158 | 1.148 | 1.145 |

FIG. 8

| Actual Test Review $h_{rev_{u,i}}$ | Closest Training Review to $\hat{h}_{rev_{u,i}}$ |
|---|---|
| skin improved (5) | makes your face feel refreshed (5) |
| love it (5) | you'll notice the difference (5) |
| best soap ever (5) | I'll never change it (5) |
| it clumps (2) | gives me headaches (1) |
| smells like bug repellent (3) | pantene give it up (2) |
| fake fake fake do not buy (1) | seems to be harsh on my skin (2) |
| saved my skin (5) | not good quality (2) |

METHOD AND SYSTEM FOR COMBINING USER, ITEM AND REVIEW REPRESENTATIONS FOR RECOMMENDER SYSTEMS

CROSS-REFERENCE TO PRIOR APPLICATION

This application claims the benefit of U.S. Provisional Application No. 62/555,670, filed on Sep. 8, 2017, which is hereby incorporated by reference in its entirety herein.

FIELD

The present invention relates to online retail, and more specifically, to online retail recommendation systems.

BACKGROUND

Online shopping allows consumers to directly buy goods and services through a virtual shop and is slowly replacing traditional shopping. In fact, online retailers have become the de-facto providers for some entertainment goods like movies, books and music. As a result, recommendation systems are of high value for both online shoppers (users) and online retailers. For the user, recommender systems quickly find products that the user may be interested in. For the retailers, recommender systems contribute to creating a need to the user by suggesting products that are likely to match preferences of the user.

Traditional recommendation systems make predictions based on previous ratings (collaborative filtering) or based on metadata information of products and profiles of a user's preferences (content-based filtering), or a mix of both (hybrid recommender systems). Furthermore, J. McAuley et al., "Hidden factors and hidden topics: understanding rating dimensions with review text," ACM (2013) have shown that using text in product reviews, written by users, for making rating predictions outperforms well-established methods that belong to either of the collaborative filtering or the content-based filtering categories.

SUMMARY

In an embodiment, the present invention provides a method for providing recommendations to users. The method includes obtaining stored data structure triples and actual ratings associated with the data structure triples; training a machine learning model using the stored data structure triples and associated actual ratings, wherein training the machine learning model includes generating user, product, and review representations based on the stored data structure triples and their associated ratings; predicting, by the machine learning model, ratings using the generated user, product, and review representations; and making recommendations based on the predicted ratings.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention provide a recommender system for making ratings predictions for one or more items (or products) based on a history of previous ratings and associated product reviews given by users. During prediction time, reviews for the one or more items are not available, so the recommender system operates in a two-fold process. The recommender system first approximates representations of reviews that a user may give about the one or more items, and then these approximations are used to make the ratings predictions. Based on these predicted ratings, the recommender system ranks the one or more items in order and displays them accordingly to the user.

Embodiments of the present invention provide a recommender system that predicts user ratings for one or more items based on a history of previous user ratings and product reviews associated with the previous user ratings that were written by an associated user. The recommender system uses the history of previous user ratings and text from the associated product reviews and relates the users, products, and reviews as a multi-relational graph. Using the multi-relational graph, reviews for the one or more items can be approximated at prediction time even when the reviews for the one or more items are not available. The recommender system then makes ratings predictions for the one or more items for each individual user based on the approximated review. These predicted ratings can be provided to an application that displays products to users according to the predictions made by the recommender system.

For ease in discussion, embodiments of the invention is described within the setting of online shopping. It is understood that some embodiments can be extended to other settings, especially settings where there are (i) interactions between users and products, and (ii) text associated with products, e.g., product reviews, product descriptions, or other type of textual content.

In an embodiment, the invention provides a method of modeling a recommender that makes use of textual content associated with products by users. The recommender is modeled as a multi-relational graph, in which reviews are considered as relationships expressing a certain degree of satisfaction. This assumption about reviews provides a mechanism to approximate the review representation that a user would give about a specific product, and then based on this approximation of the review a rating is predicted. The system is highly efficient. The recommender maps the users, products, and reviews into low-dimensional representations, where the prediction of users' ratings can be performed in constant time.

Embodiments of the present invention provide several advantages. Embodiments of the present invention provide for modeling of the recommender system as a multi-relational graph, in which review texts are considered as relationship expressing a certain degree of satisfaction. Embodiments of the present invention provide for jointly learning of user, item and review representations. Embodiments of the present invention provide for the rating prediction to be made based on the estimation of the review embedding. An advantage of embodiments of the present invention compared to the prior art is that approximation of review representations can be made at test time. These approximations can then be used to retrieve the most similar review from the training set and present the most similar review to the user as a tentative review that the user may have written about an item. The embodiments thus allow prediction of a user's review on an item that a user has not reviewed based on previous reviews of other items that a user has reviewed.

From a retailer's point of view, embodiments of the present invention provide additional functionality. The embodiments can be used by retailers to target users that will give high ratings and good reviews to their products. Once these users are targeted, products can be advertised to them to obtain good reviews and ratings, which will help the retailers to gain popularity in the market. Since some embodiments of the present invention provide suggested tentative reviews to users, these suggested reviews can help to obtain more elaborated reviews, which are very valuable to for online consumers.

Figure 1:
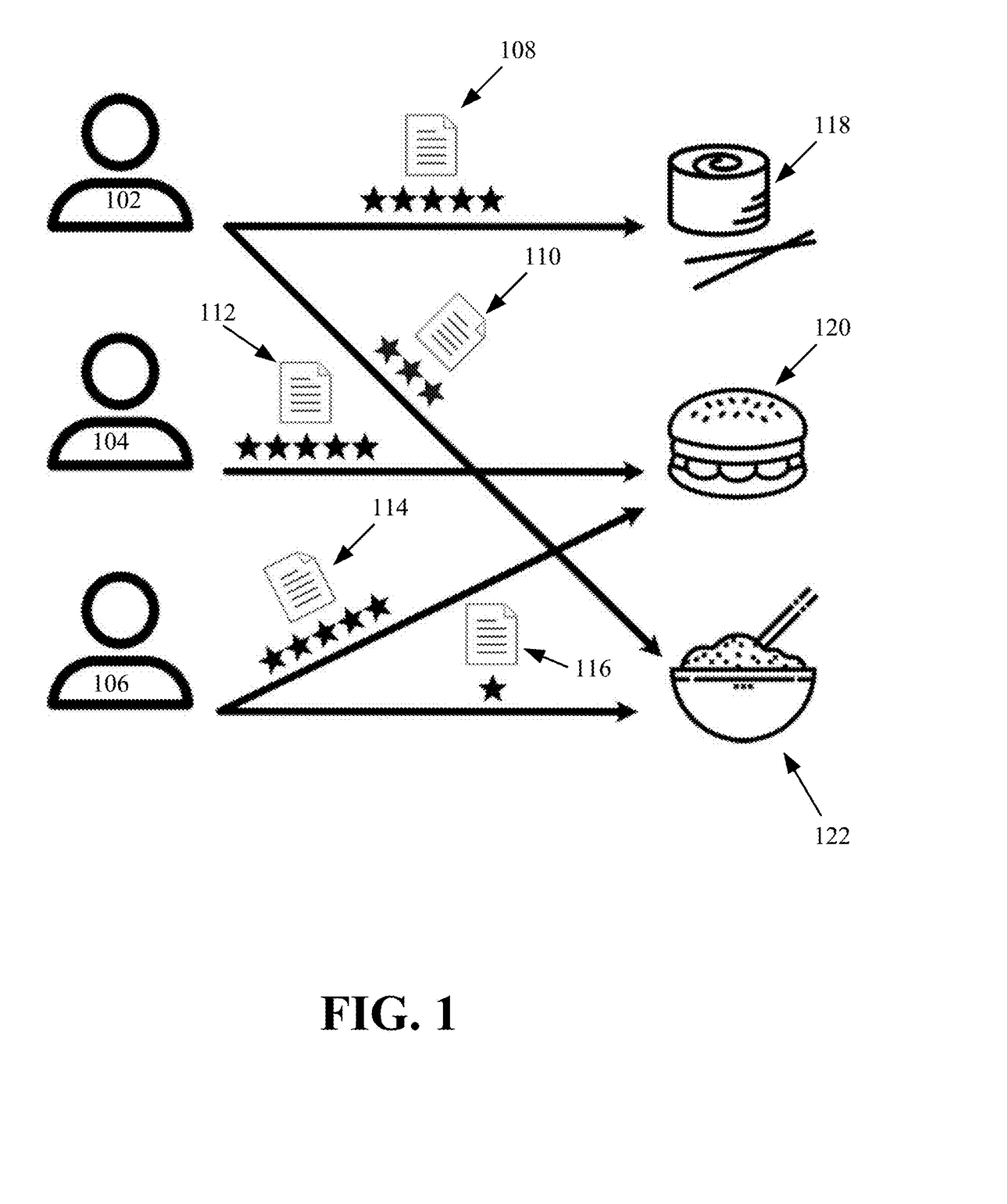
FIG. 1 illustrates an online shopping scenario where reviews are available according to an embodiment of the invention.

FIG. 1 illustrates an online shopping scenario where reviews are available according to an embodiment of the invention. The scenario in FIG. 1 includes users 102, 104, and 106 who provide reviews 108, 110, 112, 114, and 116 for products 118, 120, and 122. The scenario in FIG. 1 is depicted as a bipartite graph, which has on one side the set of users 102, 104, 106 and on the other side the set of products 118, 120, 122, and corresponding ratings and reviews 108, 110, 112, 114, 116 link the users 102, 104, 106 to the products 118, 120, 122. Embodiments of the present invention can be effectively applied to model interactions between the users 102, 104, 106 and the products 118, 120, 122, via both ratings and reviews 108, 110, 112, 114, 116. According to embodiments of the invention, machine learning algorithms can be used to predict ratings for unseen (user, product) pairs, and based on these ratings predictions, make recommendations to the users 102, 104, 106.

Let (u, $\Re\,v_{u,i}$, i) be a triple with an associated rating $r_{u,i}$, indicating that the user u has written a review $\Re\,v_{u,i}$ about an item i (product) and given a rating of $r_{u,i}$. This definition of triple is reminiscent of that of triple in the multi-relational graph literature, for example, a triple (head, label, tail) indicates that there is an edge named label between the nodes head and tail. Each of the arguments, i.e., head, label, tail, is encoded as an one-hot vector that refers to a specific relationship or entity between the arguments. Analogously, in the triple (u, $\Re\,v_{u,i}$, i), each edge is attached to a corresponding review that the user node u has given about the item node i. A review of a user u about an item i may be defined as a set of words $\Re\,v_{u,i}=[p_0^{u,i},\ldots,p_n^{u,i}]$, with $p_z^{u,i}$ signifying the z-th word appearing in the review $\Re\,v_{u,i}$ and n+1 signifying the length of the review.

In this setting, reviews are the counterparts to relationships in multi-relational graphs. In multi-relational graphs, the same relationship can link different pairs of nodes. For example, the relationship located_in can link nodes as provided in the following triples: (Tokyo,located_in,Japan) and (Berlin,located_in,Germany). However, when extended to reviews, reviews tend to be unique, that is, two or more reviews are rarely identical to each other. Nevertheless, reviews are made up of words and numbers, and similar words may appear between different reviews, conveying a shared sentiment between the different reviews. For example, words like "great" or "fantastic" are likely to be written in positive reviews, whereas words like "disappointing" or "useless" are likely to be found in negative ones. Reviews can thus be seen as relationships expressing different degrees of satisfaction.

In an embodiment, the invention provides a model that embeds all users, items, and reviews into a latent space, where the embedding of the user plus the embedding of the review is determined to be close to the embedding of the item, and simultaneously, the model learns a regressor that predicts a rating for the item, given a text. In an embodiment, at prediction time, reviews are not available, but the model allows the prediction of the review embedding by taking the difference of the embedding of the item and the embedding of the user, and using this predicted review embedding, along with the regressor, to make rating predictions. An embedding is a representation in a latent space.

In embodiments of the invention, a multi-relational graph data structure is generated based on a set of actual reviews and ratings provided by users for products. The multi-relational graph data structure includes user representations, product representations, and review representations. In the multi-relational graph data structure, each user and item representation is a node, i.e. a data object having certain values defined in reference to the latent space. Similarly, each review representation is an edge, i.e. a data object having certain values defined in reference to the latent space. Each rating is a value associated with the corresponding review. These values of the representations are learned mathematical values that solve an optimization problem, namely minimizing a distance (e.g., Euclidean distance) from a sum of the user representation and the review representation to the item representation. Also the output of a regression model, whose input is the review representation, is optimized to be close with respect to a distance to the actual rating given by the user for that item.

In an embodiment, the invention embeds all nodes, i.e. user and item representations, and edges, i.e. review representations, into a low dimensional latent space k (k is a model hyperparameter). Review latent representations $h_{rev_{u,i}}$ are the product of applying a function $f$ on embeddings of words that constitute the review, that is, $h_{rev_{u,i}}=f(\Re\,v_{u,i})$. This function $f$ can be parameterized, typically with a neural network (e.g., a recursive or convolutional neural networks), but in many cases the function $f$ is a simple parameter-free function that computes, for instance, the average or the maximum of the word embeddings in $\Re_{v_{u,i}}$.

The learning of these embeddings is driven by two learning objectives. The first learning procedure is driven by the following objective:

$$\min \mathcal{L}_1 = \min \sum_{(u,i) \in S} \left( h_{rev_{u,i}} w^T + b_{u,i} - r_{u,i} \right)^2 \quad (1)$$

where S is the set of training triples and their associated ratings, w are the learnable weights of the linear regressor, and $b_{u,i}$ is the shortcut used to refer to the sum of bias terms written as $b_{u,i} = b_u + b_i + b_0$, where $b_u$ is bias associated with the user u, $b_i$ is bias associated with the item i, and $b_0$ is overall bias. The bias terms are parameters of the model in Eq. 1 that are learned/adjusted during training. Eq. 1 involves minimizing the mean squared error between the actual rating, and the output of a regression model (parameterized by w and the bias terms) that uses the review representation $h_{rev_{u,i}}$ as input feature.

For clarity in explanation, a simple instance of $f$ is adopted, i.e., the review embedding $h_{rev_{u,i}}$ is taken to be the average of the embeddings of the words that appear in the review. Formally, $$h_{rev_{u,i}} = f(\Re_{v_{u,i}}) = \frac{1}{|\Re_{v_{u,i}}|} \sum_{p \in \Re_{v_{u,i}}} v_p + h_0 \quad (2)$$

where $v_p$ is the embedding associated to the word p and $h_0$ is a review bias, which is common to all reviews, taking all values in $R^k$. A review bias allows provision of a default contribution. An advantage of providing a review bias is that if a review is received where no words in the review are considered in a chosen vocabulary, then at least this review will have $h_{rev_{u,i}}$ computed to equal $h_0$. The vocabulary can be generated in different ways. In an embodiment, the vocabulary includes only them (e.g., m=10000) most frequent words found in the reviews.

In a real-world scenario, a recommender system makes rating predictions on items that users have not yet rated, and consequently reviews for the unrated items are not available. As a result, the application of the linear regressor of Eq. 1 to unrated items is not possible. The present invention provides a second learning procedure to overcome this limitation, leveraging ideas from embedding-based knowledge base completion methods. A mechanism that at test time that is able to infer the review embedding is provided, so that the predicted review embedding $\hat{h}_{rev_{u,i}}$ can be used in the learned regression model of Eq. 1. For such purpose, included along with the learning objective in Eq. 1, is a second objective learning that seeks to model the embedding space so that the review embedding is close to the difference between the item and user embeddings. The second objective can be formalized by including a second term that forces the distance between the embedding of the user plus the review embedding and the embedding of the item to be small:

$$\min \mathcal{L}_2 = \min \sum_{(u,i) \in S} \left\| e_u + h_{rev_{u,i}} - e_i \right\|_2 \quad (3)$$

where $e_u$ and $e_i$ represent embeddings of the user and item, respectively. The models in Eq. 1 and Eq. 3 combined represent a two-step process: firstly, an approximation of the review representation is determined by computing the vector difference between the item and user embeddings (Eq. 3), and secondly, this approximation is used as an input to the regression model of Eq. 1 (parameterized by w and the bias term $b_{u,i}$).

Trivial solutions, such as, $e_u = h_{rev_{u,i}} = e_i = 0 \forall u, i$, are avoided by jointly optimizing Eqs. 1 and 3, since a degenerated solution as the aforementioned would lead to a terrible performance in the first learning objective represented in Eq. 1.

Combining Eqs. 1 and 3 leads to the following minimization:

$$\min \mathcal{L} = \min \mathcal{L}_1 + \lambda \mathcal{L}_2 + \mu \|\Theta\|_2 \quad (4)$$

where $\lambda$ is a term that weights the reconstruction loss due to the modeling assumption formalized in Eq. 3, and $\Theta$ corresponds to the parameters w, e, v, $h_0 \in R^k$ and the bias terms b. The minimization in Eq. 4 allows making predictions for the review embedding $\hat{h}_{rev_{u,i}}$ of unseen (u, i) pairs during training by computing $\hat{h}_{rev_{u,i}} = e_i - e_u$. Along with the learned weights of the linear regressor $w^T$, predictions $p_{u,i}$ of ratings for new (u, i) pairs follows:

$$p_{u,i} = \hat{h}_{rev_{u,i}} w^T + b_{u,i} \quad (5)$$

Parameters of the two learning procedures can be jointly learned through the backpropagation technique. A new tuple may then be created associating a user, a predicted rating, and an item.

Embodiments of the present invention generate user, product, and review representations based on a history of triples and their associated ratings, i.e. based on a history of actual reviews and ratings provided by actual users for actual products. These representations are meaningful with respect to a rating prediction task, and follow a modeling assumption that allows review representations to be approximated for unseen (user, product) pairs during training.

Figure 2:
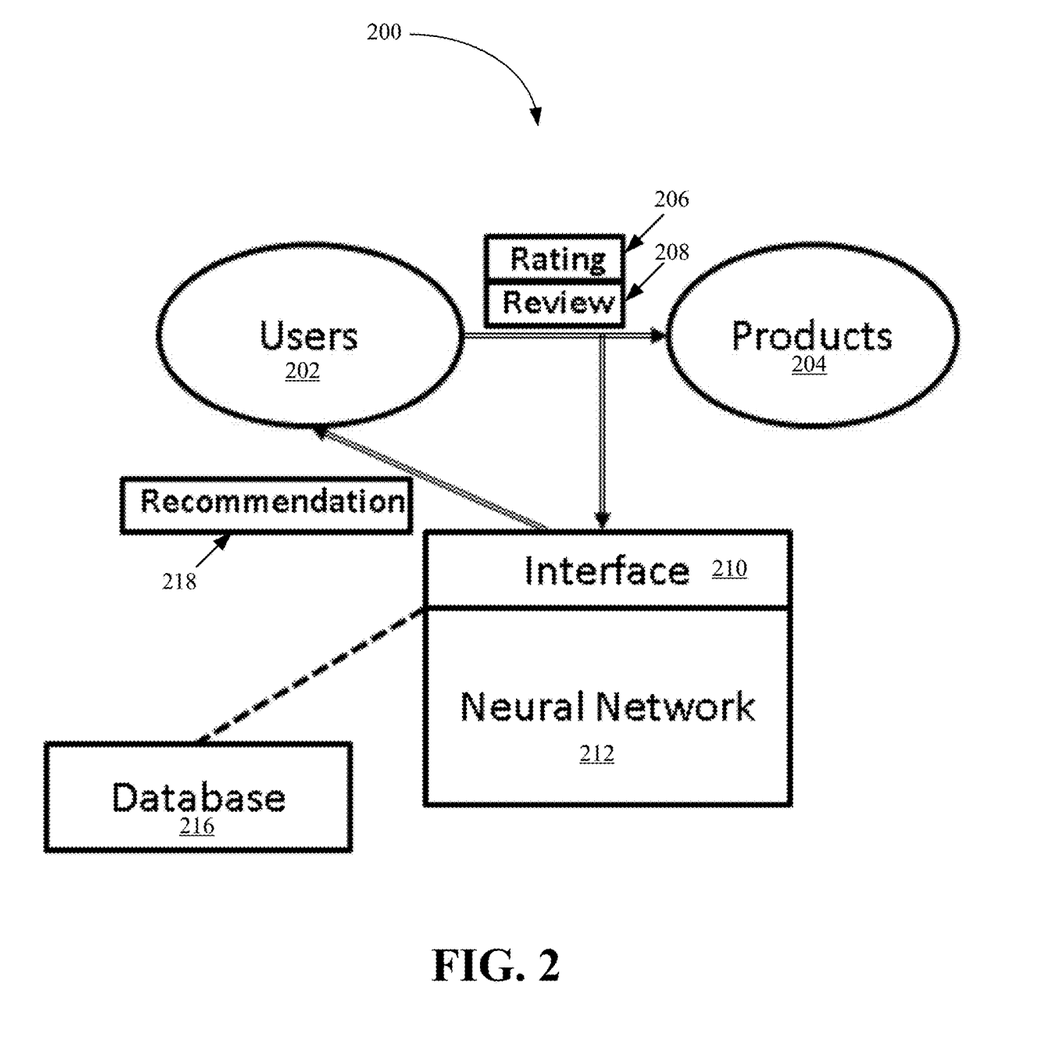
FIG. 2 is a recommender system architecture according to an embodiment of the invention.

FIG. 2 is a recommender system architecture 200 according to an embodiment of the invention. The recommender system architecture 200 includes a neural network (NN) component 212, a database 216, and an interface 210.

The database 216 contains sets of triples (u,$\Re_{v_{u,i}}$,i) and their associated ratings $r_{u,i}$, which are updated regularly as long as users 202 rate and write reviews on products 204, i.e., provide one or more ratings 206 and reviews 208 for products 204. The triples are data objects generated from the actual reviews and ratings provided by actual users for actual products. New triples and their associated ratings are sent along with the already existing information in the database 216 to the NN component 212 to adjust/re-adjust the weights of the NN component 212. The weights of the NN component 212 refer to latent representations of user, items, and reviews as well as parameters of the regression model represented in Eqs. 1 and 3. The NN component 212 aggregates all parameters of the model.

The interface 210 keeps track of the new review+rating information 206, 208 that the users 202 are introducing in the retailer webpage, and transfers this information to the database 216. The interface 210 also keeps track of the active users on the retailer webpage in order to obtain rating predictions through the NN component 212 for products that these active users have not yet rated. The interface 210 sends recommendations 218 of products with the highest predicted ratings/scores to the active users. The interface 210 may also keep track of categories of products that each user is interested in while the users are navigating through the retailer webpage.

Figure 3:
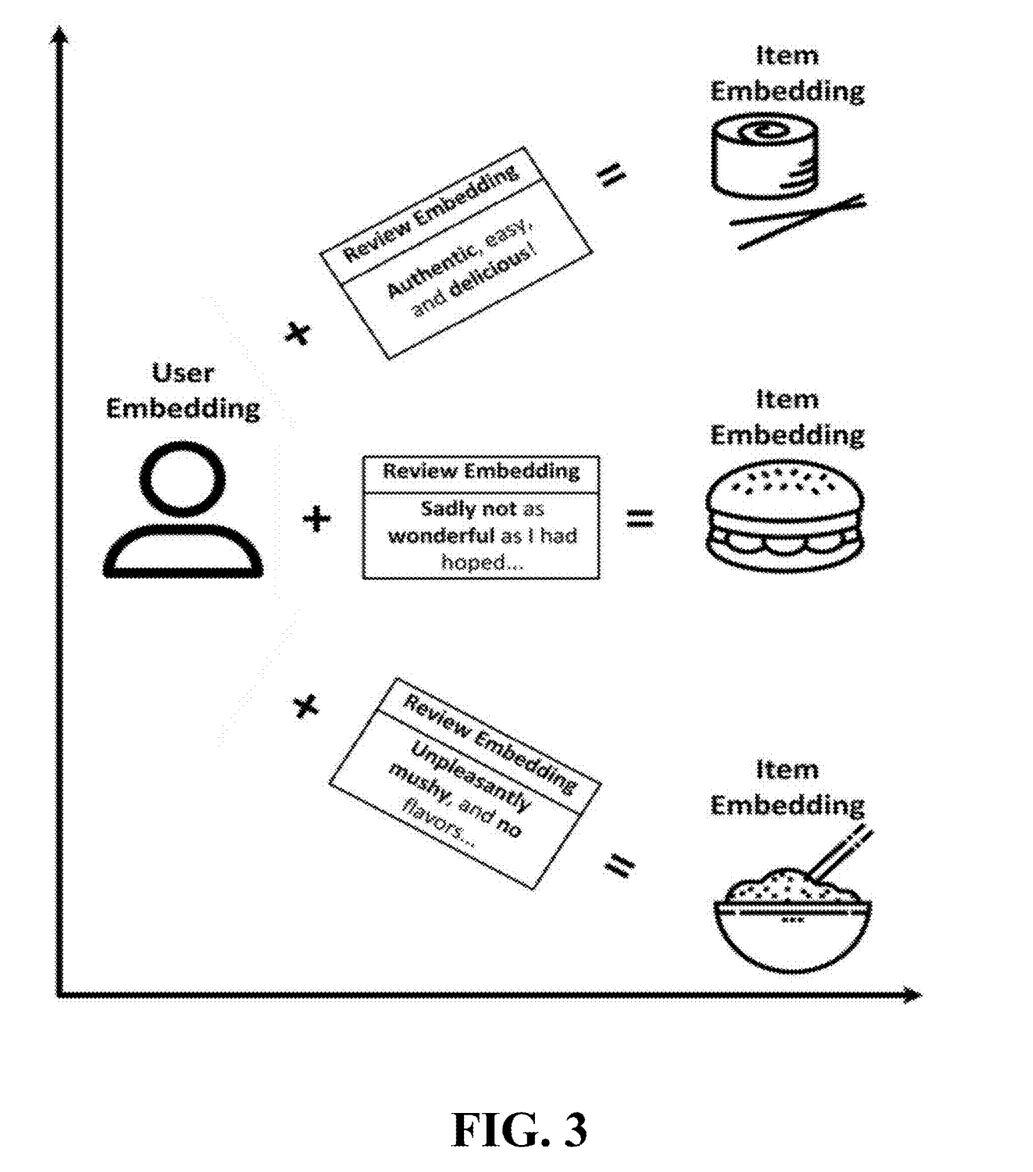
FIG. 3 is a pictorial representation of modeling assumptions according to an embodiment of the invention.

The NN component 212 computes the rating predictions for the products of the categories that match an active user's interest. These predicted ratings are sent to the interface 210. The NN component 212 embeds all users, reviews and products into a low dimensional space k, where the embedding learning process is driven by two procedures (learning objectives of Eq. 1 and Eq. 3 as described above). Low dimensional representations of the users, reviews, and products that the NN component 212 learns are interchangeably referred to as embedding or latent representation. The latent representation of the review is fed into a regression model, whose output (the predicted rating) must be close to the actual rating (see Eq. 1). FIG. 3 is a pictorial representation of modeling assumptions according to an embodiment of the invention. In FIG. 3, the embedding of the users and products are learned so that the embedding of the product is somewhere close to the embedding of the user plus the embedding of the review (see Eq. 3). As previously described, the embedding of the review can be the output of an aggregation function $f$ applied to embeddings of words that appear in the review $\Re\ v_{u,i}$, and in an embodiment, the function $f$ is an average function as shown in Eq. 2.

The motivation behind these two procedures is the following: whereas the review is highly correlated to the rating that the user has assigned to the product, these reviews are not available at test time (the system makes predictions on products that users have not rated yet), so we need a mechanism to infer the review embedding at prediction time. The second learning objective allows to get an approximation of the review embedding by computing the difference between the product and user embedding.

Embodiments of the present invention provide not only recommendations during training but can be used during testing to approximate the review representation and thus provide tentative reviews that a user would have written about one or more products. For providing tentative reviews, the interface 210 may compute the distances between the approximated review embedding and all the review representations from the training set, keeping the closest one as the tentative review that the user would write about the product.

The NN component 212 can be trained using the set of triples and ratings stored in the database 216, which are regularly transmitted by the interface 210 to re-adjust the NN component 212 weights (i.e. latent representations and regression model parameters). Embeddings and weights of the regression model can be randomly initialized and trained using stochastic gradient descent (SGD) and backpropagation.

Figure 4:
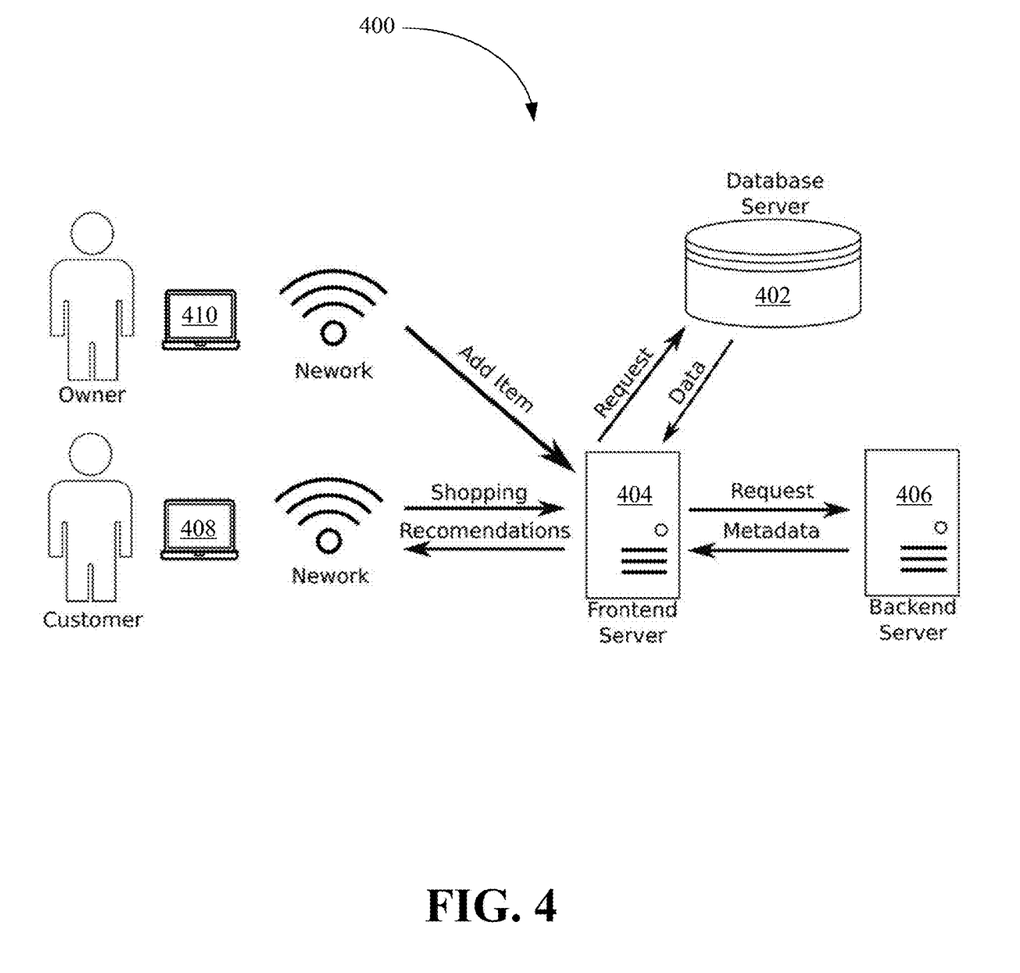
FIG. 4 illustrates an overview system architecture for deploying a recommender system according to an embodiment of the invention.

FIG. 4 illustrates an overview system architecture 400 for deploying a recommender system according to an embodiment of the invention. The recommender system runs on a platform where a database server 402 stores information related to different items and users (e.g., images, text reviews, user data, etc.). A front end server 404 connected to the Internet is the interface between the owner/administrator or customers and the recommender system. The backend server 406 contains all the parameters of the trained neural network and is charged to perform the operations that generate the recommendations. As an example of the usage, the owner 410 can add new products to the recommender system by remotely connecting to the frontend server 404. The front end server 404 is responsible for formatting and sending the information concerning the new products to the database server 402 or updating the recommender system 406 in the backend server. On the other hand, the user 408 accesses the platform though the front end server 404 and performs a normal interaction with the platform. The frontend server will automatically collect data form the customer 408 and contact the backend server 406 to get the recommendations.

As discussed, a recommender system is deployed in the overview system architecture 400. In an embodiment, the recommender system may be based on the recommender system architecture 200. The backend server 406 performs functions associated with the NN component 212. The backend server 406 stores parameters and weights used to determine recommendations. The frontend server 404 performs functions associated with the interface 210. The frontend server 404 may be a webserver. The frontend server 404 may have one or more application programming interfaces (APIs) for communicating over one or more networks with owner 410, customer 414, database server 402, and backend server 406. The database server 402 represents the database 216.

Each of the database server 402, the backend server 406, and the frontend server 404 are computing devices including one or more processors, memory, network interfaces, output devices, input devices, and/or storage devices. The processors may include a graphical processing unit and/or a central processing unit. The memory and/or storage devices may include random access memories (RAM), hard disks, flash memory, and/or solid state drives. Network interfaces may include wired or wireless network interface cards that support, e.g., Wi-Fi, Ethernet, Bluetooth, and so on. Output devices may include visual and auditory devices such as displays and speakers. Input devices may include, e.g., keyboards, cameras, microphones, and so on. Examples of computing devices are desktop computers, laptop computers, servers, computing clusters, and so on. In some embodiments, the NN Component 212 may be implemented on the backend server 406 leveraging specialized hardware, such as field programmable gate arrays (FPGAs) to enhance neural network learning speed.

Figure 5:
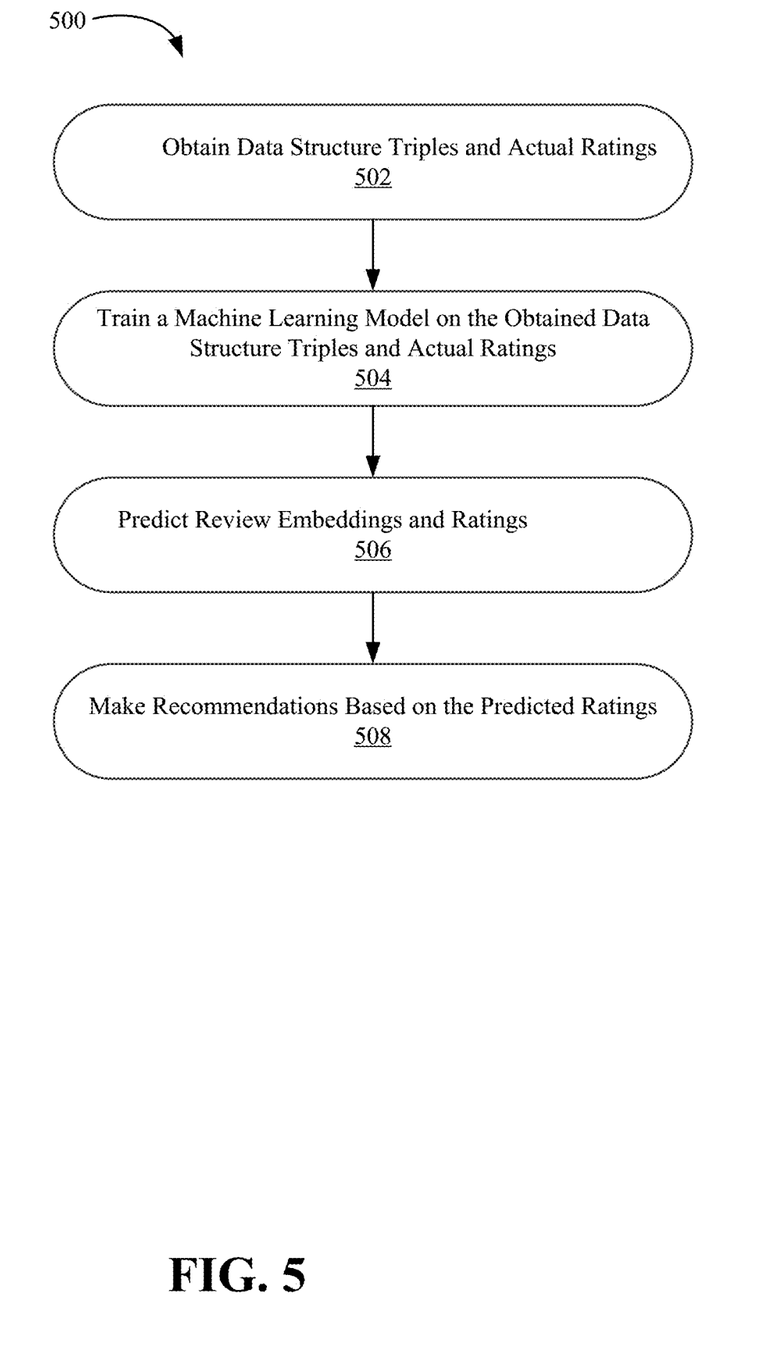
FIG. 5 illustrates a process for providing recommendations to users according to an embodiment of the invention.

FIG. 5 illustrates a process 500 for providing recommendations to users according to an embodiment of the invention. Process 500 may be performed by a recommender system substantially having the recommender system architecture 200. At step 502, the interface 210 obtains data structure triples and actual ratings associated with the data structure triples. The interface 210 may store the data structure triples and ratings associated with the data structure triples in database 216.

At step 504, the NN component 212 trains a machine learning model using the stored data structure triples and associated actual ratings. The training of the machine learning model includes generating user, product, and review representations based on the stored data structure triples and their associated ratings. The NN component 212 first computes the loss of Eq. 4, and then gradients are backpropagated to update the parameters of the model (latent representations of users, items and reviews, as well as parameters of the regression model). The gradients are computed with respect to each of the parameters of the model.

At step 506, the NN component 212 predicts using the learned representations of the user, product, and review to first predict review embeddings and then predict ratings associated with the predicted review embeddings. The NN component 212 approximates the review embedding by computing the vector difference between the representation of the item and the representation of the user. Then the NN component 212 predicts the rating using the approximated review embedding as input feature vector to the regression model.

At step 508, the interface 210 makes recommendations to users based on the predicted ratings.

Recommender systems and methods according to embodiments of the present invention can involve sentimental analysis and multi-relational graph completion. Singular Value Decomposition (SVD), where the dot product of the item and user latent representations plus some bias terms capture the user's overall interest in item characteristics, is a standard approach for collaborative filtering. In spite of the wealth of research on modeling ratings from the interaction of latent representations of users and items, many of them ignore the feedback present on review websites. It is shown that features extracted from review text are useful to improve the performance of the recommender systems. Hidden Factors as Topics (HFT) employs SVD to fit the ratings along with Latent Dirichlet Allocation (LDA) to model item latent representations as a mixture of topics based on the reviews written for each item. Therefore item representations are learned to accurately model users' ratings as well as topic distributions, which are assumed to be drawn from a Dirichlet distribution. Analogously a second version of HFT, called HFT (user), is proposed by applying LDA to model user representations as a mixture of topics based on the reviews written by each user.

In recent years there has been a flurry of deep learning architectures on text classification, including sentimental analysis. In line with this kind of works, CNN-based recommender systems such as Attn+CNN by S. Seo et al., "Representation learning of users and items for review rating prediction using attention-based convolutional neural network," MLRec (2017) have been recently proposed. In these works, predictions on ratings are the output of some operation applied to the user and item embeddings, which in turn are learned through deep architectures applied over the collection of texts written by each user and the texts written for each item, respectively.

In the last years, many embedding-based methods have been proposed to infer missing links in knowledge bases based on a scoring function that outputs the plausibility of a certain link to be true. Due to its simplicity and good performance, there has been a plethora of research on translation-based scoring functions, for example, H. Ruining, "Translation-based recommendation," ACM (2017), proposed a method for large-scale sequential prediction: it embeds items into a 'transition space' where users are modeled as translation vectors operating on item sequences, which is formulated as a sequential Bayesian ranking problem.

According to some embodiments of the present invention, sentimental analysis can be performed to predict a rating associated with review text, and at the same time model the embedding space as a multi-relational graph following a certain modeling assumption (e.g., Eq. 3) allowing, at prediction time, the representation of the review to be approximated from the embedding of the user and the one of the item.

A recommender system and method according to an embodiment of the invention was compared to several approaches based on matrix factorization and some recent models that take text into consideration on the ratings prediction task. For simplification, the embodiment of the recommender system and method according to the embodiment of the invention is referred to as TRANSREV in the following description.

In testing the recommender system and method according to the embodiment of the invention, publicly available datasets used for comparison were obtained. The publicly available datasets contained both user reviews and rating information. The first benchmark dataset was from Yelp Business Rating Prediction Challenge, which included reviews on restaurants in Phoenix (United States). The second benchmark dataset was Amazon® product data, which contained reviews and metadata from Amazon®, spanning May 1996-July 2014. Specifically, the 5-core versions (which contain at least 5 reviews for each user and item) were used within the datasets, since no request was needed to access such data. There were 24 product categories, from which 18 were selected. Each of these resulting 18 datasets were treated independently. Ratings in both benchmark datasets were integer values in a scale from 1 to 5, both included.

Each dataset was randomly divided into training, validation and test divisions in a proportion of 80%, 10% and 10%, respectively. Within the validation and test divisions, triples (and their corresponding ratings) that express a rating of a product that was not part of the training division were removed. Also triples (and their corresponding ratings) expressing the rating by a user that were not seen during training were removed.

Figure 6:
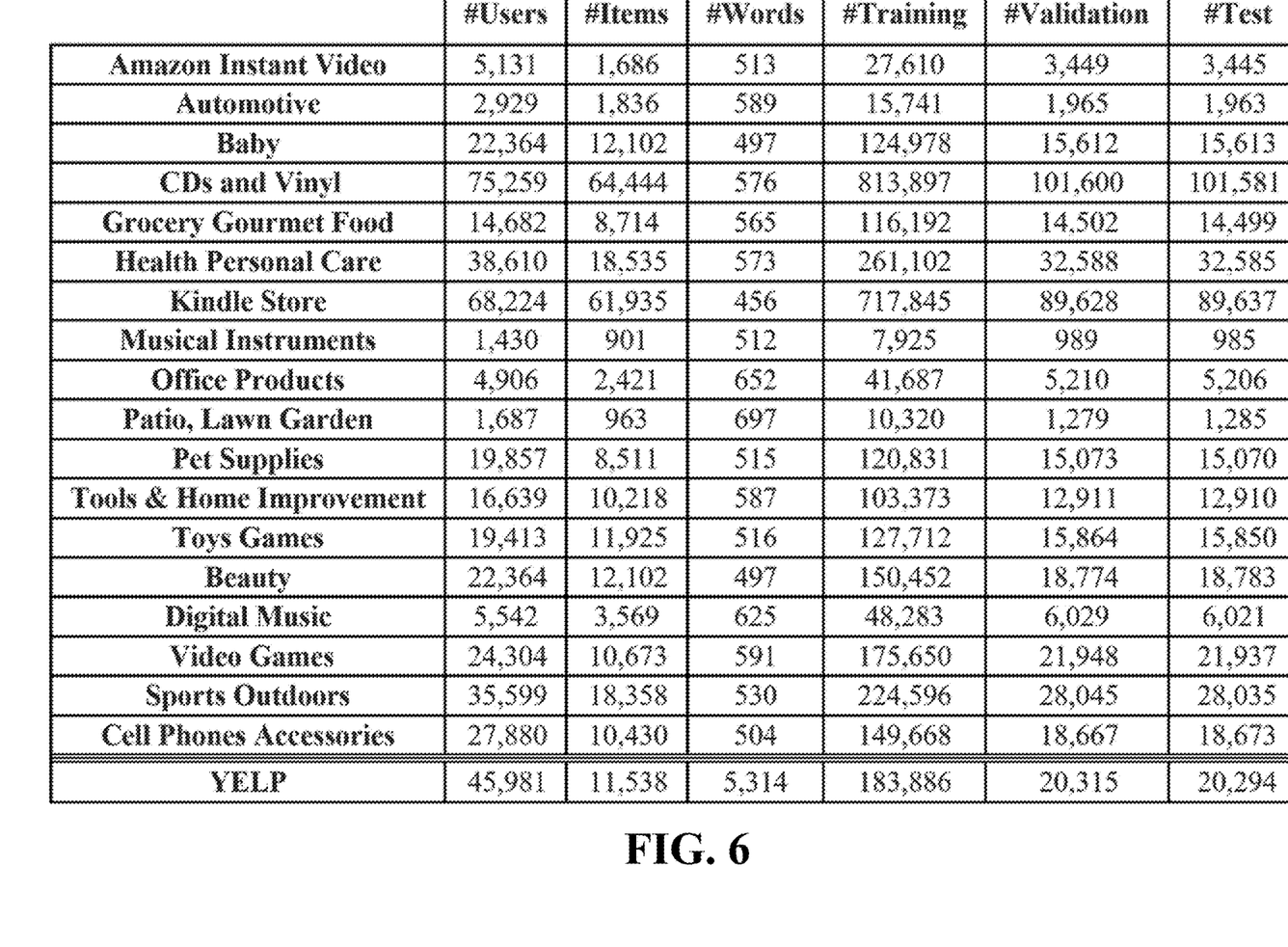
FIG. 6 shows a table summarizing benchmark datasets utilized in testing of a recommender system and method according to an embodiment of the invention.

An identical preprocessing pipeline was followed for each dataset. First, a standard tokenizer was applied to the collection of texts of the dataset, and then those words that appear in at least 0.1% of the reviews of the dataset under consideration were retained. For the Amazon® datasets, both full reviews and short summaries (about 30 words or less) by the users were available. Short summaries were used in this embodiment since classifying short documents into their sentiment is a much easier task for a short summary than for their longer counterparts. For Yelp, only full reviews were available, and as such were truncated to the first 200 words and then the preprocessing pipeline, as described, was applied to the resulting collection of truncated texts. Some statistics of these preprocessed datasets are summarized in table shown in FIG. 6.

The set of baselines can be categorized into two main groups: matrix factorization-based methods, such as SVD and Non-negative Matrix Factorization (NMF), and models that also use review texts for rating prediction, such as HFT and Attn+CNN. Performance of a naive method, Offset, that simply uses the average rating in the training set as the prediction is also provided in the example results.

For comparison and evaluation, the latent dimension k was fixed to 16 for all methods. Nevertheless, TRANSREV is robust to different values of dimensionality, not observing any significant difference in the performance when varying k. For SVD and NMF, the python package SurPRISE was used with optimization performed by vanilla stochastic gradient descent, and the learning rate and regularization term on the validation set chosen from the values [0.001, 0.005,0.01,0.05,0.1] and [0.00001,0.00005,0.0001,0.0005, 0.001]. For HFT the regularization term was validated from the values [0.001,0.01,0.1,1,10,50].

For TRANSREV, was validated among [0.1,0.25,0.5,1], and the learning rate of the optimizer and regularization term µ was validated from the same set of values as for SVD and NMF. To ensure a fair comparison with SVD and NMF, a vanilla stochastic gradient descent was used for optimization. In some embodiments, more sophisticated optimizers, e.g., Root Mean Square Propagation (RMSProp) or Adam by D. Kingma et al., "Adam: A method for stochastic optimization," arXiv:1412.6980 (2014), can be used. Parameters for HFT were fit using a default setting: Limited memory BFGS (L-BFGS), which was run for 2,500 iterations and validated every 50. Correct validation of the regularization term was beneficial to achieving best performance in all evaluated methods.

A single learning epoch iterates through all triples and their associated ratings. SVD, NMF and TRANSREV were run for a maximum of 500 epochs and validated every 10 epochs. An early stopping criterion may be implemented that stops the training if the validation metric does not improve for 50 epochs. All methods were validated according to the Mean Squared Error (MSE), which is defined as follows:

$$MSE = \frac{1}{|W|} \sum_{(u,i) \in W} (r_{u,i} - p_{u,i})^2 \quad (6)$$

where $W = \{(u, i)\}$ is either the validation or test set of pairs user-item.

MSE for Attn+CNN was obtained from S. Seo et al., where 80%, 10%, and 10% of the datasets are divided into training, validation and test divisions, respectively. TRANSREV was implemented with the Theano wrapper Keras. All experiments were run on commodity hardware with 128 GB RAM (random access memory), a single 2.8 GHz CPU (central processing unit), and an Nvidia® Titan X GPU (graphics processing unit).

Figure 7:
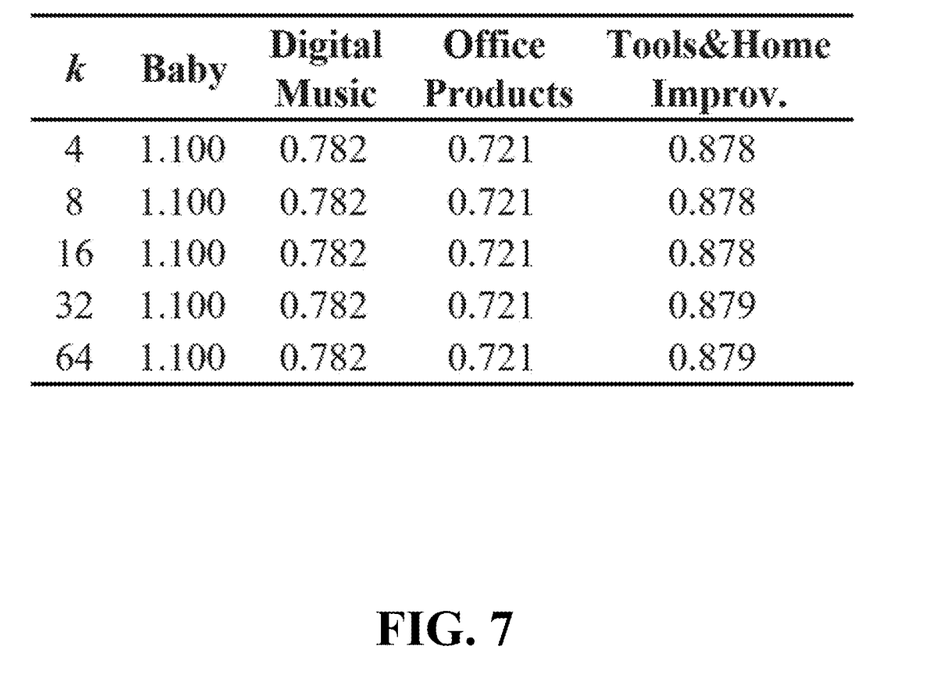
FIG. 7 shows a table with mean squared error as a function of latent dimension according to testing of a recommender system and method according to an embodiment of the invention.

In FIG. 7, 4 data sets—Baby, Digital Music, Office, and Tools & Home Improvement—are used to show invariance of TRANSREV to different values of dimensionality for user, item and word representations. k was increased from 4 to 64 and the MSE values are shown in the table in FIG. 7. The invariance shown in FIG. 7 is contrary to established belief that latent-factor models achieve highest accuracy when increasing the factor model's dimensionality.

Figure 8:
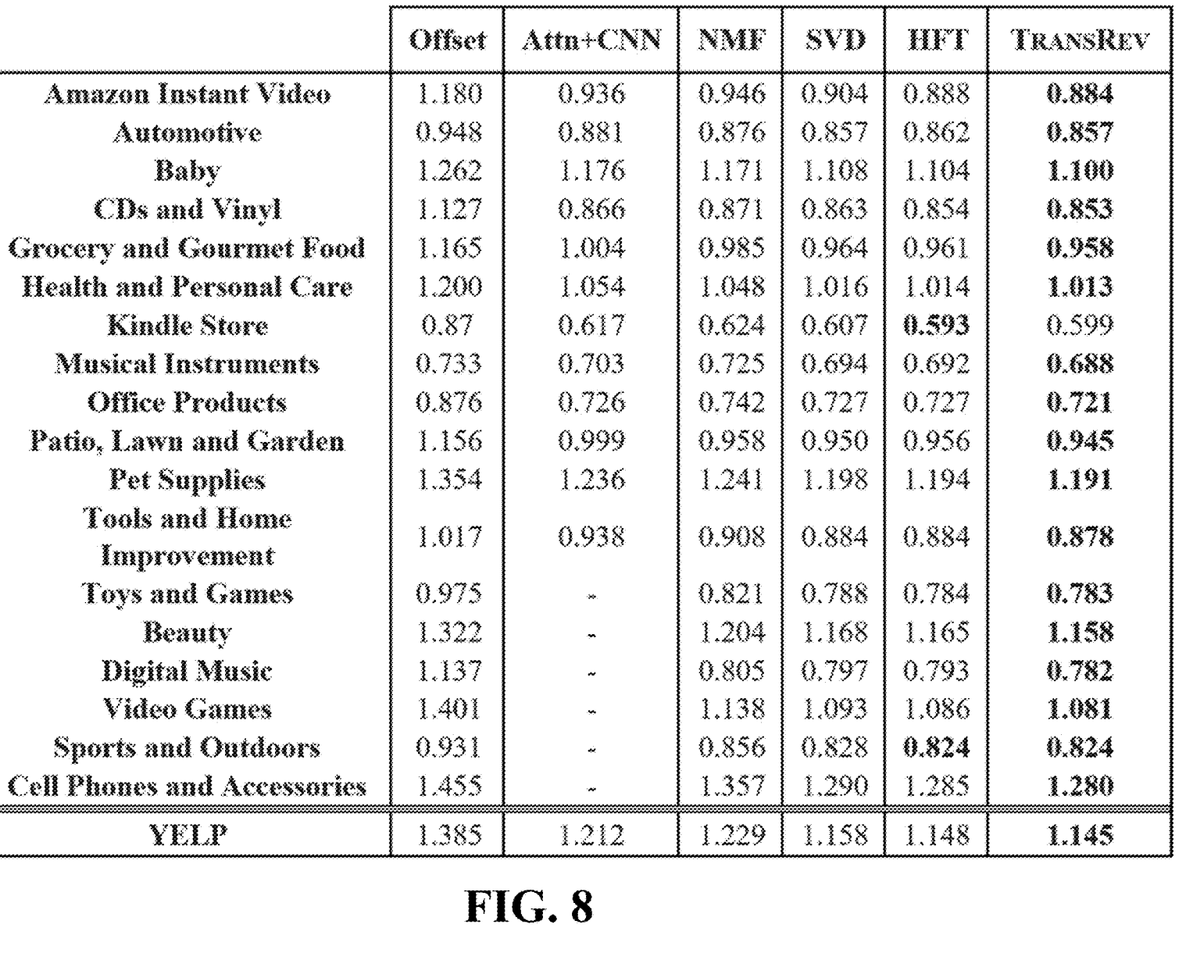
FIG. 8 shows a table comparing mean squared error for multiple approaches for rating prediction according to testing of a recommender system and method according to an embodiment of the invention.
Figure 9:
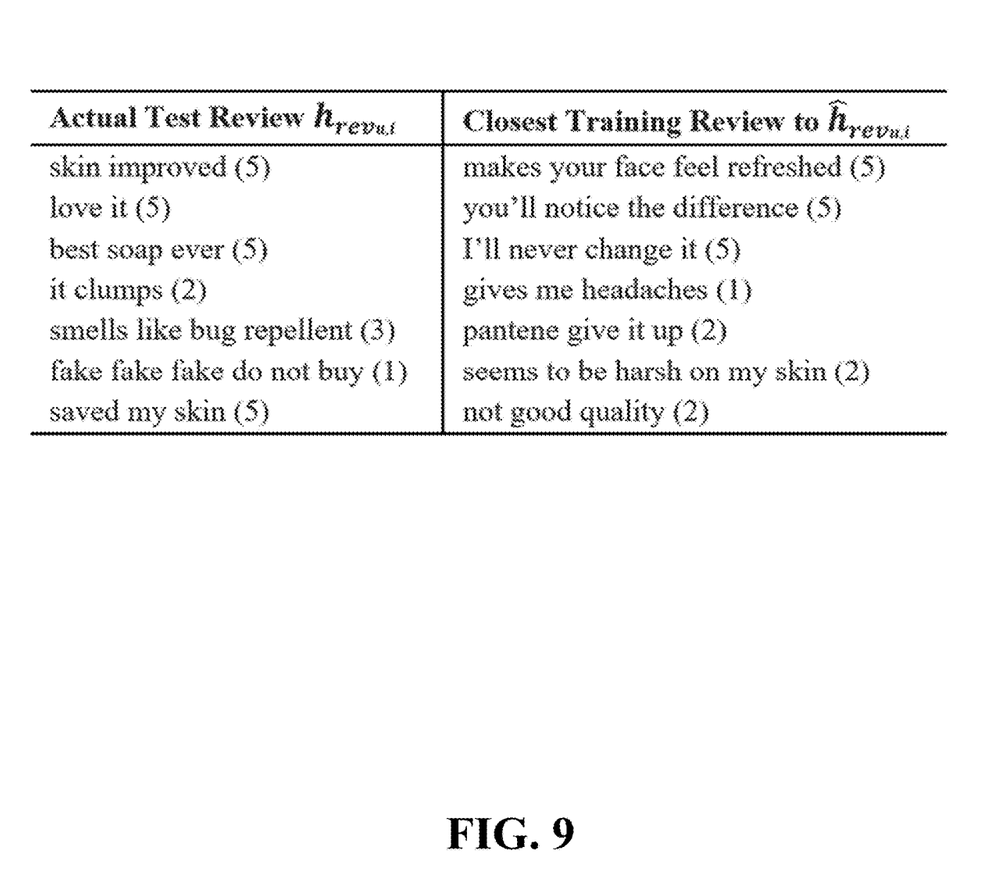
FIG. 9 shows a table comparing actual test reviews to their closest training reviews according to testing of a recommender system and method according to an embodiment of the invention.

The results for the 18 data sets of Amazon and the one of Yelp are listed in the table shown in FIG. 8, where the best performance is in bold font. TRANSREV achieved the best performance on 18 of the 19 data sets considered. Both TRANSREV and HFT systematically outperformed methods that do not take review text into account. TRANSREV was competitive with and often outperformed HFT on the benchmark datasets under consideration. Attn+CNN was shown to have a worse performance with respect to either a matrix factorization approach (SVD) or HFT or both in a large proportion of the Amazon data sets, whereas TRANSREV showed superior performance in all but one category compared to HFT.

Figure 10:
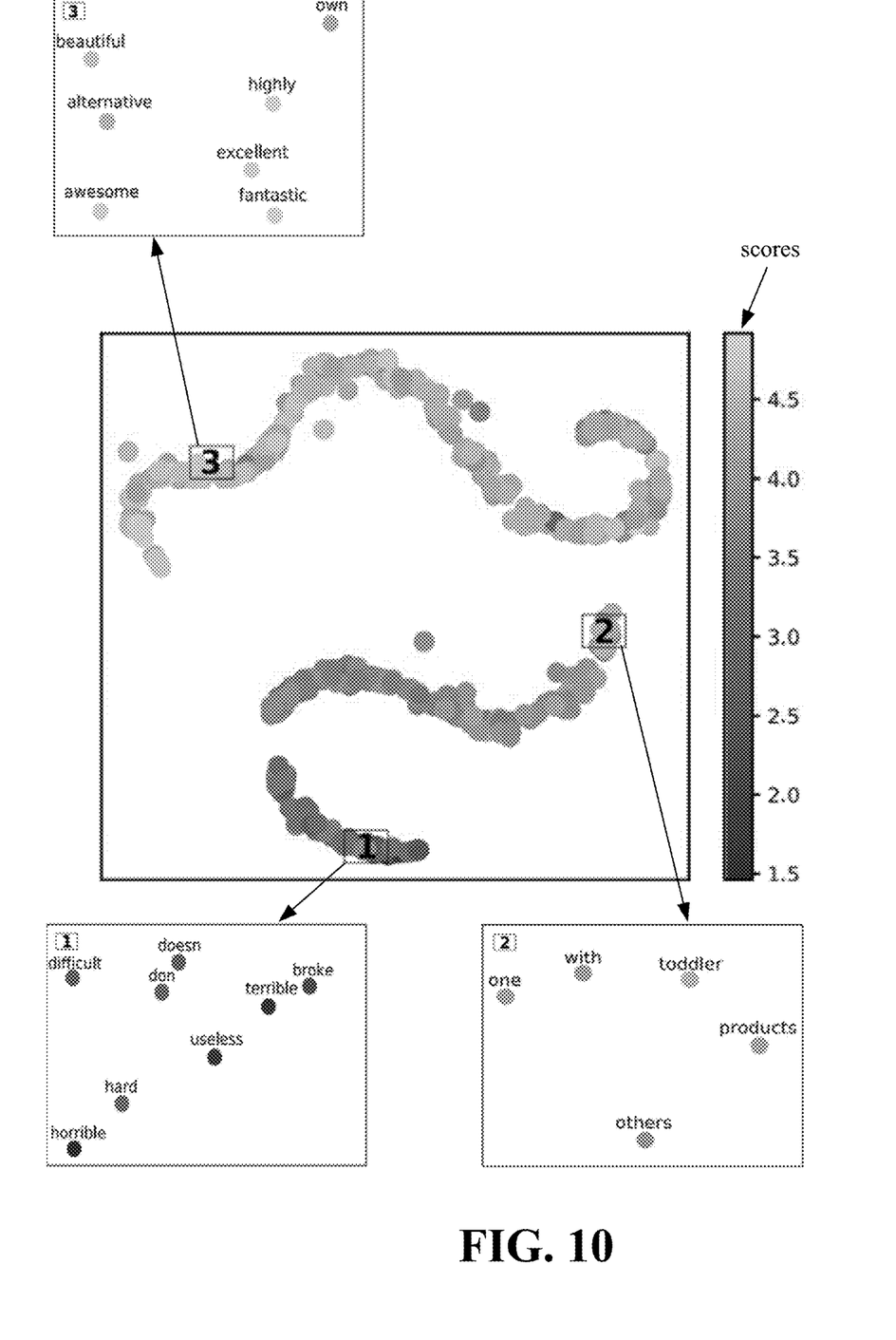
FIG. 10 illustrates a graphical representation of word embeddings and their corresponding scores according to testing of a recommender system and method according to an embodiment of the invention.

Review embeddings learned by TRANSREV were meant to be meaningful with respect to the rating associated with the review, and a review embedding is, in turn, the average embedding of the words contained in the review. As a consequence the word embeddings were correlated to the ratings. To visualize the correlation between words and ratings, firstly, a score was assigned to each word, the score being the average rating of the reviews that contain that word, and secondly, a two dimensional representation of the words was learned by applying t-SNE (t-Distributed Stochastic Neighbor Embedding) to the 16-dimensional word embeddings learned by TRANSREV. FIG. 10 depicts these 2-dimensional representations of the word embeddings learned for the Baby dataset where the corresponding scores are indicated on the right.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A system for recommending products to a selected user who has not previously reviewed the recommended products based on reviews that the selected user has provided for other products and reviews that other users have provided for actual products, the system comprising:
   one or more interfaces configured to obtain a plurality of actual reviews and actual ratings provided by actual users for the actual products, wherein the actual users include the selected user and the other users, and wherein the actual products include at least the recommended products and the other products;
   a processor configured to generate, from the plurality of actual reviews and actual ratings, a training dataset, wherein the training dataset includes data structure triples and an actual associated with each corresponding data structure triple, wherein each data structure triple includes a user component, an actual review component, and a product component;
   a database, configured to store the training dataset; and
   a neural network component,
   wherein the processor is further configured to train, by using the training dataset, one or more neural networks of the neural network component to jointly (i) generate a multi-relational graph by learning an embedding, in a latent space, for each respective user component and an embedding, in the latent space, for each respective product component as respective user nodes and respective product nodes and (ii) learn a regression model configured to receive a respective learned review embedding as an input and to provide a respective product rating as an output, wherein the respective learned review embedding is a vector difference between a respective user node and a respective product node, wherein the neural network component is further configured to:
compute, by taking differences between unseen pairs of a respective user node and a respective product node in the multi-relational graph, respective predicted reviews, wherein the unseen pairs of a respective user node and a respective product node are each a pair of a respective user node and a respective product node that do not appear together in any of the data structure triples of the training dataset, wherein each respective predicted review is a vector difference, in the latent space, between a respective user node and a respective product node of a respective unseen pair, and
compute, using the regression model, respective predicted ratings corresponding to the respective predicted reviews,
wherein the one or more interfaces are further configured to provide product recommendations to the selected user based on respective predicted ratings that correspond to the selected user and the recommended products, and
wherein the training, by using the training dataset, the machine learning model comprises:
randomly initializing the embeddings for each respective user component and each respective product component,
randomly initializing weights of the regression model, and
updating, using stochastic gradient descent and backpropagation, the embeddings for each respective user component and each respective product component and the weights of the regression model based on backpropagation.

2. The system according to claim 1, wherein the embedding of each respective actual review component is determined by applying a function on embeddings of words that constitute a respective actual review that corresponds to the respective actual review component.

3. The system according to claim 1, wherein the processor is configured to train the one or more neural networks of the neural network component to generate the multi-relational graph by training the one or more neural networks to learn first model component parameters so as to minimize differences between (i) embeddings, in the latent space, of respective actual review components and (ii) vector differences between pairs of a user node and a product node that correspond to the respective actual review components.

4. The system according to claim 3, wherein the regression model includes weights and bias terms, and wherein processor is configured to train the one or more neural networks of the neural network component to learn the regression model by determining the weights and bias terms so as to minimize a mean squared error between actual ratings and corresponding product ratings provided by the regression model as output.

5. The system according to claim 4, wherein the processor is configured to train the one or more neural networks of the neural network component to learn the first model component parameters and the weights and bias terms through backpropagation.

6. The system according to claim 1, wherein making the recommendations based on the predicted ratings comprises:
providing a list of the recommended products sorted in descending order of the corresponding predicted ratings.

7. The system according to claim 1, wherein each of the actual products is a physical product, a service, or a combination of a physical product and a service.

8. A method for recommending products to a selected user who has not previously reviewed the recommended products based on reviews that the selected user has provided for other products and reviews that other users have provided for actual products, the method comprising:
obtaining a plurality of actual reviews and actual ratings provided by actual users for the actual products, wherein the actual users include the selected user and the other users, and wherein the actual products include at least the recommended products and the other products;
generating, from the plurality of actual reviews and actual ratings, a training dataset, wherein the training dataset includes data structure triples and an actual rating associated with each data structure triple, wherein each data structure triple includes a user component, an actual review component, and a product component;
training, by using the training dataset, a machine learning model to jointly:
(i) generate a multi-relational graph by learning an embedding, in a latent space, for each respective user component and an embedding, in the latent space, for each respective product component as respective user nodes and respective product nodes, and
(ii) learn a regression model configured to receive a respective learned review embedding as an input and to provide a respective product rating as an output, wherein the respective learned review embedding is a vector difference between a respective user node and a respective product node;
computing, by taking differences between unseen pairs of a respective user node and a respective product node in the multi-relational graph, respective predicted reviews, wherein the unseen pairs of a respective user node and a respective product node are each a pair of a respective user node and a respective product node that do not appear together in any of the data structure triples of the training dataset, and wherein each respective predicted review is a vector difference, in the latent space, between a respective user node and a respective product node of a respective unseen pair;
computing, using the regression model, respective predicted ratings corresponding to the respective predicted reviews; and
making product recommendations to the selected user based on respective predicted ratings that correspond to the selected user and the recommended products,
wherein the training, by using the training dataset, the machine learning model comprises:
randomly initializing the embeddings for each respective user component and each respective product component,
randomly initializing weights of the regression model, and
updating, using stochastic gradient descent and backpropagation, the embeddings for each respective user component and each respective product component and the weights of the regression model based on backpropagation.

9. The method according to claim 8, wherein the training the machine learning model to generate the multi-relational graph comprises training the machine learning model to learn first model component parameters of a first machine learning model component so as to minimize differences between (i) embeddings, in the latent space, of respective actual review components and (ii) vector differences between pairs of a user node and a product node that correspond to the respective actual review components.

10. The method according to claim 9, wherein the embedding of each respective actual review component is determined by applying a function on embeddings of words that constitute a respective actual review that corresponds to the respective actual review component.

11. The method according to claim 10, wherein the function is parameterized with a neural network.

12. The method according to claim 10, wherein each respective actual review component in the latent space is determined to be an average of the embeddings of words that constitute the respective actual review that corresponds to the respective actual review component.

13. The method according to claim 9, wherein the regression model is a second machine learning model component that includes weights and bias terms, and wherein the training the machine learning model to learn the regression model comprises training the second machine learning model component to determine the weights and bias terms so as to minimize a mean squared error between actual ratings and corresponding product ratings provided by the regression model as output.

14. The method according to claim 13, wherein the training the machine learning model to jointly generate the multi-relational graph and learn the regression model comprises training the machine learning model to jointly learn the first model component parameters and the weights and bias terms through backpropagation.

15. The method according to claim 14, wherein the first machine learning model component and the second machine learning model component are neural networks.

16. The method according to claim 8, wherein making the recommendations based on the predicted ratings comprises:
   providing a list of the recommended products sorted in descending order of the corresponding predicted ratings.

17. The method according to claim 8, wherein each of the actual products is a physical product, a service, or a combination of a physical product and a service.

* * * * *